Dec. 29, 1964    O. L. RADER    3,163,061
DEVICE FOR CONTROL OF CUTTING SPEED OF MACHINE TOOLS
Filed Aug. 2, 1962    3 Sheets-Sheet 1

INVENTOR.
OSCAR L. RADER
BY
Woodhams Blanchard & Flynn
ATTORNEYS

Dec. 29, 1964     O. L. RADER     3,163,061
DEVICE FOR CONTROL OF CUTTING SPEED OF MACHINE TOOLS
Filed Aug. 2, 1962     3 Sheets-Sheet 2

INVENTOR.
OSCAR L. RADER
BY
Woodhams Blanchard & Flynn
ATTORNEYS

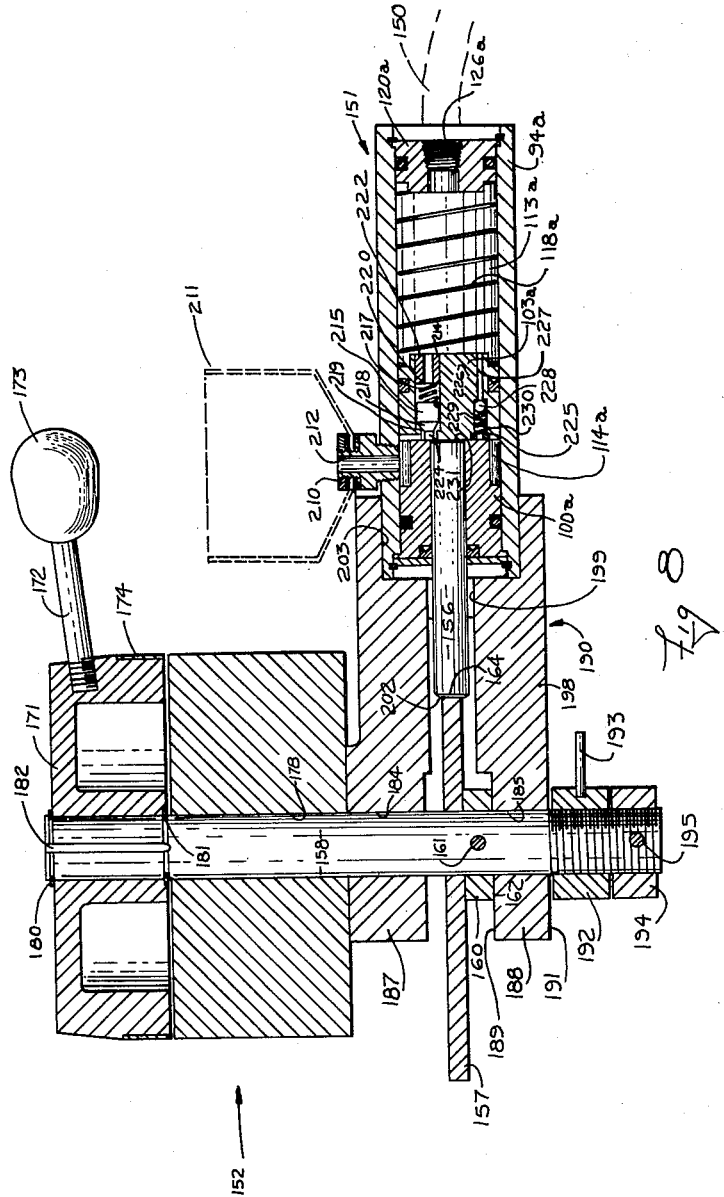

United States Patent Office 3,163,061
Patented Dec. 29, 1964

3,163,061
DEVICE FOR CONTROL OF CUTTING SPEED
OF MACHINE TOOLS
Oscar L. Rader, Portage Township, Kalamazoo County, Mich., assignor to Atlas Press Company, Kalamazoo, Mich., a corporation of Michigan
Filed Aug. 2, 1962, Ser. No. 214,303
9 Claims. (Cl. 82—2)

This invention relates to a device for adjusting the angular velocity of a rotary workpiece-holder either manually or automatically as desired, said automatic adjusting being in proportion to the travel of a tool across the radial face of a workpiece, held thereby, whereby to maintain a constant lineal velocity between the tool contact point on the workpiece and the tool. More specifically, this invention relates to a device which either selects a desired spindle speed or which selects and maintains a constant cutting speed across the radial face of a workpiece rotated on a lathe.

The desirability of selecting and maintaining a constant specified spindle speed or a constant specified cutting speed on the radial face of a rotating workpiece is well known and various methods for selecting and maintaining same appear in the art. Mechanical devices used heretofore are necessarily complex and require a number of mechanical parts which must fit each other and the machine which the device is to control with great precision. Such a device is often tailored to a given machine and will not work on machines of different types and sizes without considerable reworking of the device and/or the machine. Thus, such devices are ill-suited to use as an accessory to be installed on a machine, either during or after original manufacture of the machine.

Accordingly, the objects of this invention include:

(1) To provide a speed control means for a machine tool having a rotating spindle by which the operator may at will select a constant spindle speed or a constant cutting speed.

(2) To provide a speed control means for a machine tool having a rotating spindle, as aforesaid, by which the cutting speed may be varied as desired during the making of a cut and the speed will then stay constant at the new value.

(3) To provide a speed control means which is positive, which will maintain a selected cutting speed constant within narrow limits.

(4) To provide a speed control means which is primarily hydraulic rather than mechanical in nature, is simple in construction and operation, has few components, and incorporates standard and readily available parts.

(5) To provide a speed control means which can be sold as an accessory, which is attachable at either the manufacturing or the sales site with no modification to the control means or to the lathe and which can be readily attached to any size or type of lathe with little or no modification of either the control means or the lathe.

(6) To provide a speed control means which is extremely simple to operate, which may be attached to the lathe in a convenient manner wherein the cutting speed is easily and precisely set, and wherein the cutting speed may be easily varied if desired during the cutting operation.

(7) To provide a speed control means which is easily adapted to fully automated lathe designs wherein a constant cutting speed on radial work faces is required.

(8) To provide a speed control means which is easily maintained and requires a minimum of maintenance, effort and time.

Other objects and purposes of this invention will become apparent to persons familiar with this type of equipment upon reading the following specification and examining the accompanying drawings in which:

FIGURE 8 is a sectional view taken on the line VIII—VIII of FIGURE 6.

General Description

The objects and purposes of this invention, including those set forth above have been met in a speed control means consisting primarily of a sensing unit, an operator control unit, and a speed regulation unit.

The sensing unit consists of a pressure fluid cylinder activated through a cam shaft by an extension of the cross-feed screw of the lathe. Said fluid pressure cylinder is connected through closed, or static, hydraulic lines to the speed regulation unit which consists of a fluid pressure cylinder which controls a variable driving means through which the workpiece is rotatably driven. The operator control unit consists of a marked rotatable dial connected through a cam to a fluid pressure cylinder which connects, through the above-mentioned closed hydraulic line, to the speed regulation fluid pressure cylinder thus enabling the lathe operator to select the desired cutting speed.

Detailed Description

Figure 1:
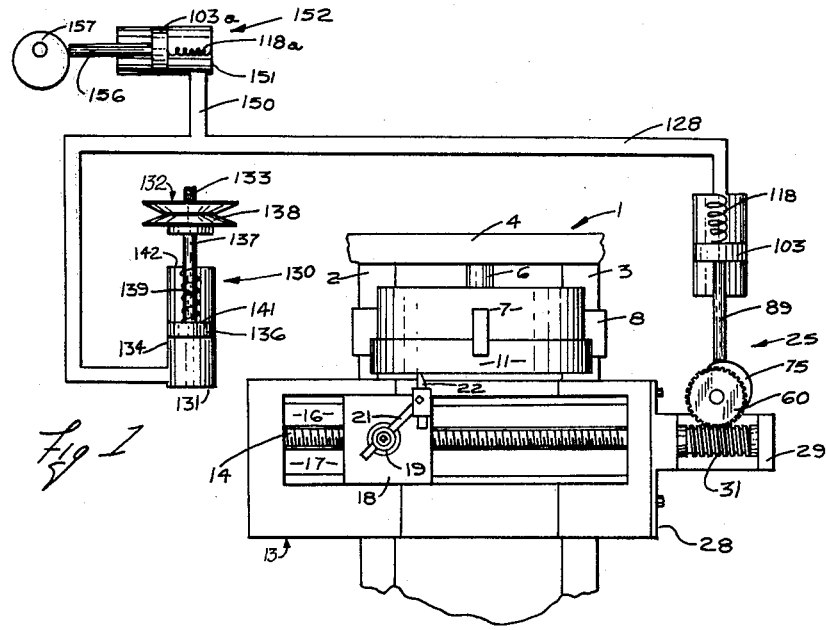
FIGURE 1 is a schematic representation of a lathe equipped with the means embodying the invention.

Referring now to FIGURE 1, the embodiment of the invention hereinafter described is attached to a lathe 1. The lathe 1 may be of any known construction and is here shown for purposes of illustration as being comprised of bedways 2 and 3 on which is mounted a chuck-shaft support 4 in which is rotatably supported a shaft 6 on which is fixedly attached the chuck 7. The chuck 7 holds by means of jaws, one of which is indicated at 8, a workpiece 11. The ways 2 and 3 also support a cross-feed table 13, lying transverse to said ways, on which a cross-feed screw 14 is rotatably held and driven in any conventional manner by motorized means not here shown. Said cross-feed screw lies between and parallel to a pair of cross-feed ways 16 and 17 and drives the tool post carrier 18 which is slidably supported by the cross-feed ways 16 and 17. The tool post carrier 18 fixedly supports the tool post 19, which fixedly supports the tool handle 21 to which the tool 22 is fixed.

Figure 2:
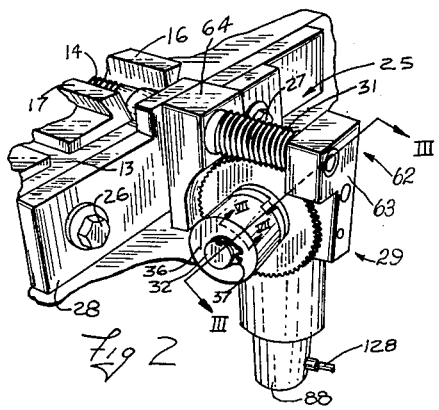
FIGURE 2 is an oblique perspective view of the sensing unit attached to a lathe taken from the gear side.
Figure 4:
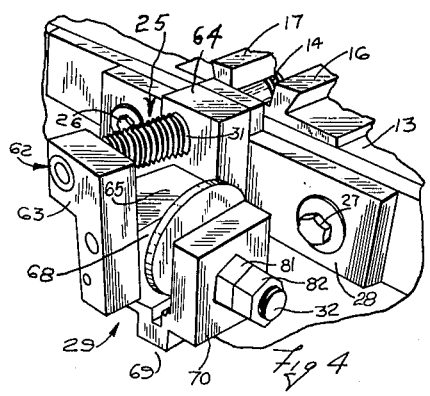
FIGURE 4 is an oblique perspective view of the sensing unit attached to a lathe as taken from the cam side.
Figure 5:
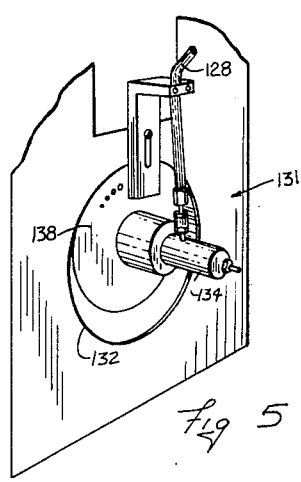
FIGURE 5 is an oblique perspective view of the speed regulation unit attached to a lathe.
Figure 6:
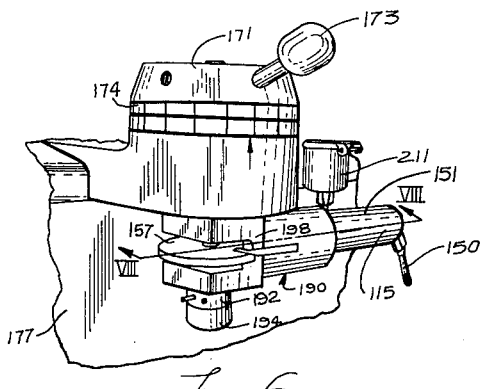
FIGURE 6 is an oblique perspective view of the operator control unit attached to a lathe.

Referring now to FIGURES 2 and 4, the sensing unit 25 of the embodiment of the invention herein discussed is fixed by a base plate 23 to the cross-feed table 13 by any convenient means here shown as the bolts 26 and 27. The base plate 28 is joined by any convenient means such as welding to a support block 29 which in this embodiment consists of an upper U-shaped member 62 with arms 63 and 64 and with a middle section 65 perpendicular to and integral with the top of an arm 68 of a lower U-shaped member 69 the central plane of which is transverse to that of the upper U member 62. The upper U-shaped member 62 rotatably supports a worm 31. The worm 31 is driven in any convenient manner not here shown by the cross-feed screw 14. The support block 29 rotatably supports a cam shaft 32 in cylindrical bearing bores 34 and 35 in the arms 68 and 70, respectively, of the lower U-shaped member 69. The longitudinal axis of said cam shaft lies transverse to the longitudinal axis of said worm and in this embodiment lies below said worm.

Figure 3:
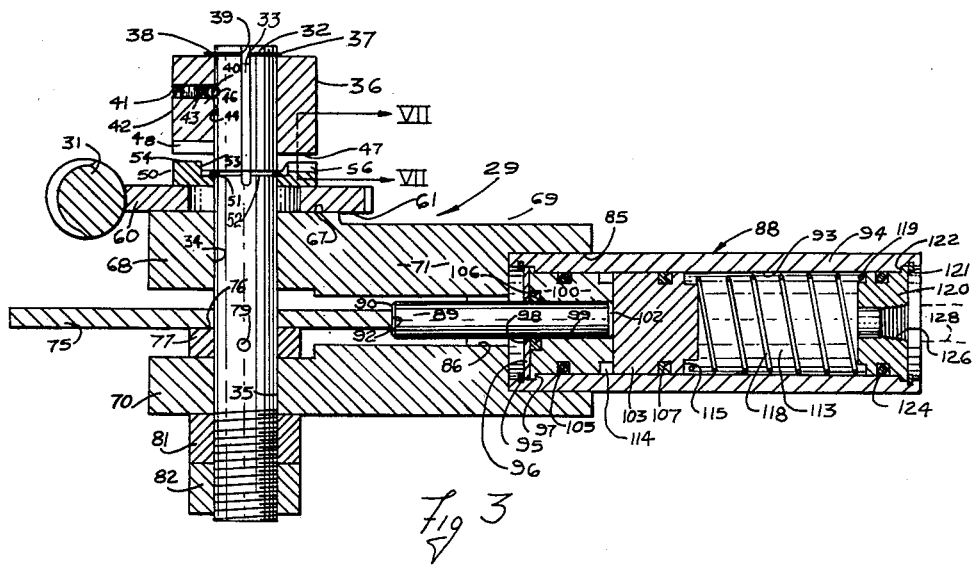
FIGURE 3 is a sectional view taken along the line III—III of FIGURE 2.
Figure 7:
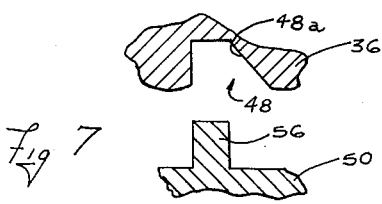
FIGURE 7 is a sectional view taken along the line VII—VII of FIGURE 2 and also indicated on the line VII—VII of FIGURE 3.

The cam shaft 32 supports on one end (upward as shown in FIGURE 3) a concentric cylindrical knob 36 which is held against outward axial movement in this embodiment by a snap ring 37 which engages a circumferential groove 38 in the cam shaft 32. The knob 36 is prevented from angular movement with respect to the cam shaft 32 in this embodiment by a key 33 riding in matching axial keyways cut in the cam shaft 32 as shown at 39 and in the knob 36 not shown. The knob 36 is fixed in either of the two axial positions on the cam shaft 32 here shown as by the retaining action of a ball detent mechanism which consists of a ball 40 riding in a radially drilled and tapped hole 41 in the knob 36, held therein resiliently by a set screw 42 and a spring 43 and lying partially in either of two axially spaced, approximately hemispherical, depressions 44 and 46 in the cam shaft 32. The knob 36 has in its axially inner face 47 several radial clutch-driven grooves 48 which are here shown as having a tapering side 48a (see FIGURE 7), subject, however, to a preferable slanting of the face 48a for overload protection. Such slanting is not sufficient to prevent return driving as discussed hereinafter.

Axially inwardly from the knob 36, the cam shaft 32 supports for relative rotation a concentric cylindrical driver ring 50 which is prevented from outward axial movement with respect to the cam shaft 32 by a snap ring 51 bearing against the axially outer surface of a circumferential recess 53 cut in the axially outer surface 54 of the driver ring 50 and which engages a circumferential groove 52 in the cam shaft 32. The axially outer surface of the drive ring 50 supports several radial clutch teeth 56, which engage the radial clutch grooves 48 of the knob 36 when said knob is in the axially innermost of its two fixed axial positions on cam shaft 32 and which are disengaged from the clutch-driven grooves 48 when the knob 36 is in the axially outermost of its two fixed positions on the cam shaft 32. The axially inner surface of the drive ring 50 is fixed, in any convenient manner such as by welding, concentrically to the axially outer surface of a gear 60 which engages the worm 31. The axially inner surface 61 of said gear bears rotatably against the surface 67 of the arm 68 of the support block 29.

A cam 75 lies between the arms 68 and 70 and is fixed, in any convenient manner such as by welding, to the axially inner surface 76 of a cylindrical collar 77 which is concentric with and attached by the pin 79 to the cam shaft 32. The axially outer surface of the collar 77 is adjacent to the inner surface of the arm 70.

A retainer nut 81 and lock nut 82 are threadedly fixed to the cam shaft 32 axially outwardly of the arm 70. Said nuts prevent leftwardly (as shown in FIGURE 4) movement of the cam shaft 32 while rightward (referring in FIGURE 2) movement of the cam shaft 32 is prevented by the snap ring 51.

The midsection 71 of the lower U member 69 contains a relatively large cylindrical recess 85 facing outwardly. A smaller cylindrical hole 86 is bored through the midsection 71 concentric with the recess 85. The common axial centerline of said hole and recess lies in the central plane of the cam 75 and intersects the axial centerline of the cam shaft 32. The shaft end of a fluid pressure cylinder 88 of conventional and known type hereinafter described for purposes of illustration is fixedly seated in the recess 85 by any convenient means not here shown so that the pressure cylinder shaft 89 passes through the hole 86 and so that the cylinder shaft end 90 slidingly contacts the ramp surface 92 of the cam 75.

The pressure cylinder here shown consists of a cylindrical barrel 94 which houses at its shaft end a concentric shaft support cylinder 100 restrained for motion relative to the barrel 94 by a snap ring 95, a retainer disk 96, a shoulder 97 inside the barrel 94 and the inner surface 93 of the barrel 94. The shaft 89 slidingly engages the surfaces of the bores 98 and 99, respectively, in and concentric with the retainer disk 96 and the support cylinder 100. Pressure fluid leakage is controlled by the O-ring 105 and the chevron packing 106.

The end 102 of the shaft 89 bears on a cylindrical piston 103 slidingly fixed to and concentric with the inner surface 93 of the barrel 94. The chevron packing 107 between the piston 103 and the interior wall 93 of the barrel 94 minimizes pressure fluid leakage from the central chamber 113 to the overflow chamber 114.

A helical spring 118 lies in and is concentric with the walls of the main chamber 113. Said spring bears on the surface 119 of a cylindrical bulkhead 120 which is concentric with the barrel 94 and which defines the lower end of the main chamber 113 as seen in FIGURE 3. Said spring also bears on the surface 115 of the piston 103 thereby maintaining at all times through the piston 103 a moderate urging of the shaft 89 against the surface 92 of the cam 75. The bulkhead 120 is fixed to the barrel 88 by the snap ring 121, the shoulder 122 and the interior surface 93 of the barrel 88. Pressure fluid leakage around the bulkhead 120 is controlled by the O-ring 124. The bulkhead 120 is pierced by a threaded bore 126 by which the pressure fluid cylinder 88 connects to a hydraulic line 128 (see FIGURE 1).

The hydraulic line 128 carries the essentially incompressible pressure fluid preferably used herein to a speed regulation unit 130 (see FIGURE 1) which consists of a pressure fluid cylinder 131 connected to a variable speed pulley 132 of the shaft 133 of a motor (not shown) which through said pulley ultimately rotates the chuck 7 of the lathe 1. The pressure fluid cylinder 131 may be of any convenient type and is here shown schematically for purposes of illustration as consisting of a cylindrical housing 134 containing a concentric cylindrical piston 136 driving one end of a rod 137 the end of which engages the movable side 138 of the variable speed pulley 132. A piston return spring 139 is provided between the end 141 of the piston 136 and the end wall 142 of the fluid pressure cylinder 131. The spring may be replaced or aided by, if desired, a spring (not shown) on the pulley 132 which would tend to maintain said pulley at its smallest effective diameter.

The operator control unit 152 of the embodiment of the invention herein discussed is attached to the lathe 1 at any convenient location. The upper end of a cam shaft 158 as seen in FIGURE 8, supports a cylindrical turret 171 to which is attached a substantially radially extending handle 172 terminating in a knob 173. A concentric cylindrical dial 174 is fixed to the turret at its lower end. The turret 171 may be fixed to the cam shaft 158 by any convenient means, including a bore 178 therethrough, here shown as an upper snap ring 180 and a lower snap ring 181 and a key 182.

The lower part of the cam shaft 158 rides rotatably in the bores 184 and 185 in the arms 187 and 188, respectively, of a U-shaped member 190 which is fixed by means, such as screws, not shown, to the support 177. A cam 157 is fixed to, by means such as welding, and supported by a collar 160, said collar being concentric with and fixed to the cam shaft 158 by a pin 161 between the arms 187 and 188 of the U member 190. The side 162 of said collar bears rotatably against the surface 189 of the arm 188 thus limiting possible downward movement of the cam shaft 158.

The radially outer surface of the lower end of the cam shaft 158 is threaded to receive a concentric cylindrical internally threaded locking nut 192 which, by any convenient means not here shown, fixedly supports a radially cylindrical handle 193. Said locking nut, upon being threaded upwardly, engages the lower surface 191 of the arm 188 and through the friction of said engagement tends to prevent rotation of the cam shaft 158 and the turret 171. Upon being threaded downwardly, the locking nut 192 ceases to restrict rotational movement and the turret 171 may be rotated to any desired position. Said locking nut is restricted in its downward movement by a collar 194 which is concentric with and fixed to the lower extremity of the cam shaft 158 by a pin 195.

The midsection 198 of the U-shaped member 190 is pierced by a bore 199 through which extends a concentric cylindrical rod 156, the central axis of which lies in the central plane of the cam 157 and the leftward end 202 of which engages the ramp surface 164 of the cam 157. A fluid pressure cylinder 151 is concentric with the rod 156 and is fixed to the midsection 198 of the U-shaped member 190 by any convenient means. The pressure cylinder 151 is here shown as inserted into a concentric rightwardly facing blind bore 203 and held by means not shown.

Said pressure cylinder may be of any desired construction and is here shown for purposes of illustration as being of generally similar construction to the fluid pressure cylinder 88 of the sensing unit 25. Therefore, the description and numbering of the fluid pressure cylinder 88, with the suffix "a" added, will also apply to the pressure cylinder 151 with the exceptions noted immediately hereinbelow.

The barrel 94a is breached radially outwardly of the overflow chamber 114a to receive a fitting 210 which connects to a fluid reservoir 211 and which is bored at 212 so that fluid may pass between the reservoir 211 and the chamber 114a. The piston 103a contains a fluid admittance valve 214 which may be of any convenient construction but is here shown as consisting of a nosed piston 215 loosely and slidingly contained in a cylindrical bore 217 which is axially parallel to the longitudinal axis of the piston 103a. The nose 218 of the piston 215 in its closed position abuts a shoulder 219 in the piston 103a thus preventing fluid flow from the chamber 114a past the piston 215. A helical spring 220, lying in and concentric with the bore 217, at its rightward end bears against a cylindrical sleeve 222 which is fixed at the rightward end of the bore 217. Said spring at its leftward end bears against the piston 215 tending to maintain said piston in its closed position. When the piston 103a approaches the leftward limit of its travel, the tip 224 of the nosed piston 215 contacts the surface 231 of the support cylinder 100a thus moving the piston 215 rightwardly with respect to the moving piston 103a and permitting fluid flow from the chamber 114a to the main chamber 113a through the bore 217.

The piston 103a also contains a pressure relief valve 226 which acts to relieve excessive fluid pressure in the main chamber 113a by allowing excess fluid to return to the reservoir 211. The valve 226 may be of any convenient construction but is here shown as consisting of a cylindrical inlet passage 227 which is parallel to the axis of the piston 103a and is closed at its leftward end by a ball 228 riding in a cylindrical chamber 229. A helical spring 230, concentric with the chamber 229, by bearing rightwardly against the ball 228, tends to maintain said ball 228 in its closed position. A washer 225 is fixed by means not shown in the leftward radial face of the piston 103a and abuts the leftward end of the spring 230.

The rightward end of spring 118a bears against the bulkhead 120a which is pierced by a threaded bore 126a which connects through a suitable fitting not shown to the hydraulic line 150 indicated dottedly which connects to the hydraulic line 128.

Operation

Assuming calibration to have been completed as discussed hereinbelow, the workpiece to be chucked in the lathe, the chuck rotating, and the tool positioned to begin cutting, the turret 171 is rotated by the operator so that the dial 174 indicates the proper spindle or cutting speed.

The setting of the turret 171 determines, through the cam 157, the position of the piston 103a in the fluid pressure cylinder 151. The consequent change in hydraulic pressure in the line 128 does not affect the position of the piston 103 of the sensing unit 25 but does cause a directly proportional change in the position of piston 136 of the regulation unit 130 and thus a change in the effective diameter of the variable pitch pulley 132. Thus, the initial spindle and cutting speeds are set.

Upon activating the cross-feed screw 14, the tool is driven across the radial face of the work. Assuming that constant cutting speed operation is desired, the knob 36 having been made to engage the drive ring 50, as discussed hereinabove, the cross-feed screw 14 rotates and acts through the worm 31, gear 60 and the cam 75 to cause the piston 103 to move inwardly (upwardly as shown in FIGURE 1). The consequent increase in hydraulic line pressure does not affect the operator control unit 152 but does move the piston 136 of the regulation unit 130 upwardly (as shown in FIGURE 1) which increases the effective diameter of the variable speed pulley 132 on the motor shaft 133 and thus increases the rotational speed of the workpiece 11. The ramp surface 92 of the sensing unit cam 75 is so designed that the cutting speed remains constant throughout the travel of the cutting tool 22 on the radial surface of the workpiece 11. Said cutting speed may be varied from its constant value if desired at any time by varying the setting of the turret 171 of the operator control unit 152.

Upon completing a cut, the tool may be returned to its starting position by reversing the cross-feed screw. Said reversal returns by means of the worm 31, the gear 60 and the cam 75, the piston 103 of the sensing unit 25, and thus the piston 136 of the regulation unit 130, to their respective starting positions. The operator control unit 152 is not affected by said reversal. A second cut can then be made with a cutting speed identical to that used for the first cut thus automatically provided.

Should it be desired, the radial surface of a workpiece may be cut at a constant spindle speed rather than at a constant cutting speed by moving the knob 36 of the sensing unit 25 to the axially outermost of its two fixed positions on the cam shaft 32 whereby the knob 36 is disengaged from the drive ring 50. In this mode, rotation of the cross-feed screw 14 drives, through the gear 60, only the drive ring 50 which spins freely on the cam shaft 32. The knob 36, the cam shaft 32, the cam 75, and thus the piston 103 remain stationary as do the pistons 103a and 136 of the operator control unit 152 and the regulation unit 130, respectively. Thus, in this mode, the effective diameter of the pulley 132 and, therefore, the spindle speed, remains constant. The selection, however, of a particular spindle speed is effected as described above.

The discussion of operation hereinabove assumes the embodiment of the invention herein described to be mounted on the lathe 1 with motor and spindle pulleys of diameter suitable for the range of spindle and cutting speeds desired and that the control system involved in this invention has been suitably calibrated. Said calibration may be achieved in one of several ways, one of which is immediately hereinafter described for purposes of illustration.

Assuming a constant spindle speed rather than a constant cutting speed to be desired, assuming the knob 36 to be disengaged from the drive ring 50 of the sensing unit 25, and assuming the dial 174 of the operator control unit 152 to be recorded in units of spindle speed, the aforementioned calibration may be accomplished (see FIGURE 1) by placing the piston 103 of the sensing unit 25 and the piston 103a of the operator control unit at the points of their travel closest to the rotative center of the cams 75 and 157. The piston 136 of the regulation unit 130 is placed at the limit of its travel farthest from the variable motor speed pulley 132 thus setting said pulley at its smallest effective diameter. The reading of the dial 174 of the operator control unit 152 will now agree with the calculated or measured spindle speed of the lathe 1 at this dial setting if the dial 174 has been properly affixed to turret 171 of the operator control unit. The dial 174 of the operator control unit 152 is then rotated to a different setting and the dial reading now agrees with the calculated or measured spindle speed if the correct dial 174 has been mounted on the turret 171. This completes all calibration required for use of the operator control unit 152 as a spindle speed control and the setting of the dial 174 will produce the spindle speed shown on said dial. The cutting speed used may be easily calculated given the spindle speed and the distance of cutting tool contact from the rotational axis of the workpiece.

The operator control unit 152 and speed regulation unit 130 as hereinabove may be used in conjunction with the sensing unit 25 to maintain a constant cutting speed rather than a constant spindle speed. Assuming that the dial 174 has been made to reflect accurately the spindle speed of the lathe (as by the procedure outlined immediately hereinabove) a given constant cutting speed may be effected by the following procedure. The tool point is positioned at a given reproducible distance from the rotational center of the workpiece which will hereinafter be referred to as distance "C" and which may be the distance from the rotational center of the workpiece at which the cutting tool 22 is to begin cutting. Said distance "C" is noted and is used with the desired cutting speed to complete the required spindle speed. Said spindle speed is set on the dial 174 by rotation of the turret 171 of the operator control unit 152. The knob 36 is then made to engage the drive ring 50 of the sensing unit 25, the spindle and cross-feed screw drive means are activated, and cutting begins. Upon completing the desired cut, the tool 22 may be returned to its starting or any other desired position for a second cut by reversing the cross-feed screw 14 in any convenient manner. Further cuts are made as above discussed and cutting speed is maintained constant automatically. Cutting speed may be changed at any point during the above process by varying the spindle speed setting of the dial 174 of the operator control unit 152. Accurate determination of the new cutting speed requires its calculation from the aforementioned distance "C" and the new spindle speed as shown on the dial 174.

To resume cutting at constant spindle speed which speed is to be accurately represented by the dial 174, after completing cuts at constant cutting speed, the cutting point of the tool 22 must be first returned to the distance "C" from the rotational center of the workpiece 11 through rotation of the cross-feed screw 14 by any convenient means. The dial 174 may be set at the desired spindle speed and the knob 36 may then be disengaged from the drive ring 50 to allow constant spindle speed operation. Should the latter two operations be carried out without returning the tool point to the distance "C" in the prescribed manner, the dial 174 will not read the correct spindle speed.

Should the dial 174 record cutting speed rather than spindle speed, calibration may be accomplished in the following manner. The pistons 103, 153 and 136 are positioned at the limits of their travel with the knob 36 disengaged from the drive ring 50 to the sensing unit 25. The tool point is positioned at a given reproducible distance (hereinafter referred to as the distance "CC") from the rotational center of the workpiece 11. Cutting speed may be calculated from the measured or calculated (from motor and spindle pulley diameters as well as from the diameters of any other pulleys in the motor spindle train) spindle speed and the distance "CC." The dial 174 will now indicate the calculated cutting speed if it has been correctly affixed to the turret 171.

The relative placement of cutting speed indicia on the dial 174 may be checked by calculating the cutting speeds resulting from other settings of the turret 171. Assuming the correct dial 174 to be correctly affixed to the turret 171 as above determined, the knob 36 is made to engage the drive ring 50. A cut may now be made at a constant specified cutting speed by selecting said cutting speed on the dial 174 of the operator control unit 152. A second cut may be made after returning the tool 22 to the desired positions by reversing the rotation of the cross-feed screw 14 by any convenient means. Should it be desired, initial cutting speed may be changed at any time during operation in the constant cutting speed mode to a new specified value by rotating the turret 171 to the position in which the dial 174 indicates the desired cutting speed.

Should it be desired, cuts may be made at constant spindle speed rather than constant cutting speed by returning the tool point to a given reproducible distance from the rotational center of the workpiece, which will herein be considered for the sake of convenience to be the distance "CC" mentioned hereinabove. The cutting speed at which the dial 174 is to be set may then be calculated from the distance "CC" and the spindle speed desired. The knob 36 may then be disengaged from the drive ring 50 to allow constant spindle speed operation and the tool 22 may be positioned at the desired point to begin cutting. The constant spindle speed so acquired may be changed by varying the setting of the dial 174. Accurate determination of the new spindle speed requires its calculation from the cutting speed as read from the dial 174 and the distance "CC."

Returning to the constant cutting speed mode requires resetting the dial 174 at its reading during the change to constant spindle speed operation and requires resetting of the tool point to the distance "CC" from the rotational center of the workpiece. The knob 36 may then be made to engage the drive ring 50 and cutting may be resumed at constant cutting speed, said cutting speed being accurately shown on the dial 174 due to the maintenance of calibration through use of the above-mentioned procedures.

If tools are changed, calibration with either spindle or cutting speeds on the dial 174 may be maintained by positioning the cutting point of the new tool in the same radial plane of the cross-feed screw as was the cutting point of the first tool and by allowing no movement of the cross-feed screw 14 and dial 174 during said tool change.

It will be recognized that the range of spindle speeds which may be dialed on the operation control unit 152 is directly dependent on and controlled by the range of effective diameters which can be assumed by the variable ratio pulley 132. Should it be desirable in a given situation, the range of spindle speeds available to the operation without changing pulleys may be widened by use of any one of several devices well known in the art one of which would be an accessory gear box, which permits the selection of any one of several stepped gear ratios, in the motor spindle drive train. Use of such a device by machine operator might be facilitated by use of a dial 174 which would carry several suitably identified ranges of speed indicia, each range corresponding to a selectable gear box ratio.

It will be recognized that, when the embodiment of the invention herein described is in the constant cutting speed mode of operation, that range over which the radius of cut (distance from the cutting tool point to the rotational center of the workpiece) may be varied at constant cutting speed depends upon the innermost radius of cut desired. For example, maintenance of a constant, finite, non-zero, cutting speed when the cutting point is at the precise center of rotation of the workpiece would require an infinite spindle speed. Thus, the embodiments of the invention herein described automatically assume nonconstant cutting speed operation when the radius of cut is small compared to range of cut radius required for a given job.

The range over which the radius of cut may be varied while maintaining constant cutting speed, also depends directly upon the difference between the effective diameter of the variable speed pulley 132 when the tool 22 is set at its maximum desired radius of cut and the maximum effective diameter which said pulley can produce. Thus, it is desirable that pulleys of such diameter be installed, that the maximum desired radius of cut for a given cutting operation corresponds to the minimum effective diameter available from the variable speed motor pulley 132.

Should pressure fluid be lost from the system through leakage, an amount of pressure fluid equal to that lost may be admitted to the system from the reservoir 211. To insure maintenance of calibration, the piston 103 of the sensing unit 25 may be placed at the limit of its travel nearest the cam 75 through appropriate rotation of the cross-feed screw 14 (assuming the knob 36 to be engaging the drive ring 50 in accordance with the hereinabove described calibration technique). The piston 103a of the operator control unit 152 (FIGURE 1) is then moved to the limit of its travel nearest the cam 157 causing the surface 231 of the support cylinder 100a to bear forcibly on the tip 224 of the fluid inlet piston 215 and moving the fluid inlet piston 215 rightwardly (see FIGURE 8) from its closed position. Said unseating of the piston 215 allows pressure fluid from the reservoir 211 to flow through the chamber 114 and through the inlet passage 217 into the main chamber 113a of the pressure fluid cylinder 151. The spring 142 of the speed regulation unit 130 maintains the piston 136 at the limit of its travel farthest from the pulley 132 and the spring 118 of the sensing unit 25 maintains the piston 103 at the limit of its travel nearest the cam 75 during admittance of fluid to the system. Said operation may be conveniently carried out as the cutting tool is returned to its start position for a new cut after several cuts have been made.

Although a particular preferred embodiment of the invention has been described above in detail for illustrative purposes, it will be recognized that variations or modifications of such disclosure, which lie within the scope of the appended claims, are fully contemplated.

What is claimed is:

1. In a machine tool having a rotative spindle and a tool feeding means including a cross-feed screw, control means for controlling the rotational speed of said spindle, comprising in combination:

driving means for said spindle including selectable speed ratio means having a range of selectable spindle driving ratios and a pressure fluid responsive device for controlling the selection of said spindle driving ratios;

a first cam and means for rotating same in response to rotation of said cross-feed screw;

first pressure imposing means actuatable in response to rotation of said first cam and a static fluid pressure line connecting said first pressure imposing means with said pressure responsive means;

a second cam and manually controllable means for rotating said second cam;

second pressure imposing means operable in response to rotation of said second cam and a second static pressure line connecting said second pressure imposing means to a point in said first pressure line intermediate said first pressure imposing means and said pressure responsive means;

whereby the position of said pressure responsive means may be controlled by movement of either said first or second pressure imposing means independently of the other.

2. In a machine tool the combination comprising: a rotatable spindle;

tool feeding means;

means including variable ratio drive means connected to said spindle for driving said spindle and pressure responsive means for controlling the ratio of said drive means;

a conduit connected to said pressure responsive means and a substantially incompressible fluid filling said conduit;

pressure imposing means connected to said conduit and variable in volume by movement of said tool feeding means for exerting a pressure upon said fluid to displace same in said conduit;

whereby movement of said tool feeding means effects a corresponding change in the rotational speed of said spindle.

3. The device defined in claim 2 wherein said pressure imposing means comprises a pressure fluid cylinder having a reciprocable piston therein, spring means for constantly urging said piston in one direction and a rod extending from said piston outwardly of said cylinder and energizable by movement of said tool feeding means for urging said piston against the force of said spring means, one end of said pressure fluid cylinder being connected to said conduit and being filled with said fluid between said one end and said piston whereby movement of said tool feeding means causes said piston to exert a pressure on said fluid.

4. The device defined in claim 2 wherein said variable ratio drive means includes a variable diameter pulley rotatably drivable for driving said spindle at a variable rate; and said pressure responsive means comprises a pressure fluid cylinder having a piston rod connected to said pulley for varying the diameter thereof.

5. The device defined in claim 2 including also a further pressure imposing means and manual control means for manually operating same and means including a second conduit for connecting said further pressure imposing means to said pressure responsive means and further incompressible fluid filling said second conduit, whereby the position of said pressure responsive means may be selected manually and independently of the position of said tool feeding means.

6. The device defined in claim 2, including a releasable clutch located in the power train between said tool feeding means and said pressure imposing means whereby engagement of said clutch connects said tool feeding means to said pressure imposing means.

7. The device defined in claim 5 wherein said further pressure imposing means comprises a pressure fluid cylinder including:

a reciprocable piston and spring means for urging said piston towards one end of said cylinder;

a fluid reservoir and means connecting said reservoir through said one end of said cylinder;

a normally closed valve in said piston and means for opening same when said piston reaches said one end of said cylinder for filling said cylinder between said piston and the other end of said cylinder with fluid from said reservoir;

means connecting said second conduit to said cylinder between said piston and said other end;

whereby opening of said valve allows said reservoir to maintain a proper amount of fluid in said conduits, pressure responsive means and pressure imposing means.

8. The device defined in claim 6 wherein said clutch comprises;

a first member drivable by said tool feeding means, a second member and means connecting said second member to said pressure imposing means for energizing same;

means supporting said first and second members for movement toward and away from each other;

resilient means for holding said members in an engaged position;

surfaces on said first and second members interengageable upon relative movement of said members toward each other for allowing said first member to drive said second member, said surfaces being sloped with respect to the direction of driving thrust applied thereto;

whereby excessive driving thrust disengages said clutch.

9. In a machine tool, the combination comprising: a rotatable spindle;

a rotatable spindle; tool feeding means;

tool feeding means;

a pressure fluid responsive device having movable output means displaceable in response to a change in fluid pressure and connected to said spindle for varying the rate of rotation thereof;

first pressure imposing means and linkage connected between said first pressure imposing means and said tool feeding means for varying the volume of said first pressure imposing means in proportion to movement of said tool feeding means;

second pressure imposing means, manually controllable means and linkage connected between manually controllable means and said second pressure imposing means for varying the volume of said second pressure imposing means in response to movement of said manually controllable means;

static pressure lines connecting said first and second pressure imposing means with said pressure responsive means;

whereby the position of said pressure responsive means may be controlled by movement of said first and second pressure imposing means independently of each other.

References Cited by the Examiner
UNITED STATES PATENTS

| | | | |
|---|---|---|---|
| 2,150,032 | 3/39 | Herman et al. | 82—21 |
| 2,422,681 | 6/47 | Johnson | 82—29.1 XR |
| 2,561,724 | 7/51 | Bickel | 82—29.1 XR |

WILLIAM W. DYER, JR., *Primary Examiner*.

UNITED STATES PATENT OFFICE
CERTIFICATE OF CORRECTION

Patent No. 3,163,061                December 29, 1964

Oscar L. Rader

It is hereby certified that error appears in the above numbered patent requiring correction and that the said Letters Patent should read as corrected below.

Column 11, line 10, strike out "a rotatable spindle; tool feeding means;"; column 12, below line 18, insert the following:

FOREIGN PATENTS 948,750      9/56      Germany

Signed and sealed this 20th day of April 1965.

(SEAL)
Attest:

ERNEST W. SWIDER
Attesting Officer

EDWARD J. BRENNER
Commissioner of Patents